United States Patent

Okajima et al.

[11] Patent Number: 6,068,348
[45] Date of Patent: May 30, 2000

[54] BICYCLE WHEEL

[75] Inventors: Shinpei Okajima, Izumi; Tsutomu Muraoka, Sakai, both of Japan

[73] Assignee: Shimano Inc., Osaka, Japan

[21] Appl. No.: 09/108,300

[22] Filed: Jul. 1, 1998

Related U.S. Application Data

[63] Continuation-in-part of application No. 09/027,293, Feb. 20, 1998, which is a continuation-in-part of application No. 08/969,607, Nov. 13, 1997.

[51] Int. Cl.[7] .................................................. B60B 1/04
[52] U.S. Cl. ............................ 301/58; 301/95; 301/104
[58] Field of Search .................................. 301/54, 55, 58, 301/59, 61, 79, 104

[56] References Cited

U.S. PATENT DOCUMENTS

| | | |
|---|---|---|
| 720,048 | 2/1903 | Miller . |
| 734,731 | 7/1903 | Miller . |
| 818,175 | 4/1906 | Howe et al. ............................... 301/58 |
| 1,384,128 | 7/1921 | Gase . |
| 1,450,064 | 3/1923 | Dodds . |
| 1,483,398 | 2/1924 | Whitehead . |
| 1,492,850 | 5/1924 | Hubbard . |
| 3,008,770 | 11/1961 | Mueller ...................................... 301/97 |
| 3,608,971 | 9/1971 | Siebold ...................................... 301/58 |
| 5,104,199 | 4/1992 | Schlanger ............................. 301/63 DD |
| 5,350,221 | 9/1994 | Pearce et al. ............................ 301/104 |
| 5,445,439 | 8/1995 | Dietrich ................................ 301/58 X |
| 5,452,945 | 9/1995 | Schlanger .................................. 301/58 |
| 5,540,485 | 7/1996 | Enders ...................................... 301/104 |
| 5,707,114 | 1/1998 | Schlanger . |
| 5,882,088 | 3/1999 | Yahata .................................... 301/59 X |

FOREIGN PATENT DOCUMENTS

| | | |
|---|---|---|
| 1019285 | 1/1953 | France . |
| 2324471 | 4/1977 | France ...................................... 301/59 |
| 2378642 | 1/1978 | France . |
| 2707559 | 7/1993 | France . |
| 2703753 | 8/1977 | Germany ............................... 301/104 |
| 211318 | 7/1984 | Germany . |
| 1382668 | 3/1988 | U.S.S.R. . |
| 12439 | 7/1892 | United Kingdom ..................... 301/55 |
| 4388 | 2/1898 | United Kingdom . |
| 9712 | 4/1898 | United Kingdom . |
| 16421 | 7/1913 | United Kingdom ..................... 301/55 |

*Primary Examiner*—Russell D. Stormer
*Attorney, Agent, or Firm*—Shinjyu Global IP Counselors, LLP

[57] ABSTRACT

A bicycle wheel basically has a hub, a plurality of spokes extending outwardly from the hub and an annular rim coupled to the outer ends of the spokes for supporting a tire. The annular rim has a spoke attachment portion with a plurality of openings and radially extending recesses for receiving the outer end portions of the spokes therein. The outer end portions of the spokes are at least partially recessed within the radially extending recesses to provide an aerodynamic design. The outer end portions of the spokes are preferably bent such that first sections of the spokes are offset from sections of the spokes. These bends are positioned in the openings of the rims to retain the outer ends of the spokes in the openings of the rim. In selected embodiments, the offset section between the first and second sections is either thicker or corrugated.

45 Claims, 12 Drawing Sheets

1

BICYCLE WHEEL

CROSS-REFERENCES TO RELATED APPLICATIONS

This application is a continuation-in-part application of U.S. patent application Ser. No. 09/027,293, filed on Feb. 20, 1998, which in turn is a continuation-in-part application U.S. patent application Ser. No. 08/969,607, filed on Nov. 13, 1997. The entire disclosures of U.S. patent application Ser. No. 09/027,293 and U.S. patent application Ser. No. 08/969,607 are both hereby incorporated herein by reference.

BACKGROUND OF THE INVENTION

1. Field of the Invention

This invention generally relates to a bicycle wheel with a hub adapted to be mounted to a bicycle frame, an annular rim and a plurality of spokes extending inwardly from the rim to the hub. More specifically, the present invention relates to the connection between the spokes and the rim of the bicycle wheel.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. One particular component of bicycles, which has been extensively redesigned over the past years, is the bicycle wheel. Bicycle wheels are constantly being redesigned to be lightweight and more aerodynamic in design as well as to be simple to manufacture and assemble.

There are many different types of bicycle wheels, which are currently available on the market. The most basic bicycle wheels have a hub portion, a plurality of spokes and an annular rim. The hub portion is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are provided with a flange that is used to coupled the spokes to the hub. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples, which secure the outer ends of the wire spokes to the rim. In particular, the spoke nipples have flanges, which engage the interior surface of the rim.

With a spoke constructed in this manner, the nipple is installed in a nipple hole formed in the rim, the spoke is inserted through the hole of the hub flange with the flange of the inner end of the spoke engaging the hole of the hub flange. The male threads on the outer ends of the spokes are threaded into the female threads of the spoke nipples installed in the openings of the rim. One problem with conventional spokes is the concentrated stress applied to the rim. Specifically, conventional spokes are attached to the inner edge of the rim. Thus, the amount of force that can be applied to the rim by the spokes depends upon the thickness of the inner edge of the rim. In order to accommodate the stress from the spokes, the inner edge of the rim can be made thicker. However, the increases the weight of the rim. Moreover, conventional spokes are not very aerodynamic in design.

In view of the above, there exists a need for an improved bicycle wheel, which is lightweight yet strong and which is more aerodynamic in design to reduce air resistance. This invention addresses this need in the prior art as well as other needs, which will become apparent to those skilled in the art from this disclosure.

SUMMARY OF THE INVENTION

One object of the present invention is to provide a bicycle wheel with a more aerodynamic design to reduce air resistance.

Another object of the present invention is to provide a bicycle wheel, which is lightweight in design.

Another object of the present invention is to provide a bicycle wheel with fewer spokes extending between the rim and the hub.

Another object of the present invention is to provide a bicycle wheel, which is can be relatively easy to manufacture by conventional manufacturing techniques.

Still another object of the present invention is to provide a bicycle wheel, which is relatively inexpensive to manufacture in comparison to other performance bicycle wheels.

The present invention can basically be obtained by providing a spoked rim assembly, comprising an annular rim and a plurality of inwardly extending spokes in which the spokes are received in recesses of the rim. In particular, the annular rim has an outer annular surface configured to receive a tire thereon, a pair of oppositely facing spoke attachment portions extending radially inwardly from said outer annular surface, and an inner annular surface extending between said spoke attachment portions. The spoke attachment portions are provided with a plurality of circumferentially arranged openings and a plurality of radially extending recesses located inwardly adjacent of each of the openings. Each of the spokes has an outer end portion, a center portion and an inner end portion. The outer end portion is at least partially positioned within one of the openings and one of the recesses of the annular rim. The center portion is located radially inwardly of the outer end portion, while the inner end portion is located radially inwardly of the center portion.

The foregoing objects can also be attained by providing a spoked rim assembly comprising an annular rim and a plurality of inwardly extending spokes in which the outer end portion of each of the spokes has a first predetermined width that is at least ten times the first predetermined thickness of the outer end portion. In particular, the annular rim has an outer annular surface configured to receive a tire thereon, a pair of oppositely facing spoke attachment portions extending radially inwardly from said outer annular surface, and an inner annular surface extending between said spoke attachment portions. The spoke attachment portions are provided with a plurality of circumferentially arranged openings. Each of the spokes has an outer end portion, a center portion and an inner end portion. The outer end portion is at least partially positioned within one of the openings of the annular rim. The outer end portion of each spoke has its first predetermined width extending in a first direction and its first predetermined thickness extending in a second direction, which is substantially perpendicular to the first direction. The first predetermined width of the outer end portion is at least ten times the first predetermined thickness of the outer end portion. The center portion is located radially inwardly of the outer end portion, while the inner end portion is located radially inwardly of the center portion. The center portion has a second predetermined width in the first direction and a second predetermined thickness in the second direction. The inner portion is coupled to the center portion, and is located radially inwardly of the center portion.

The foregoing objects can also be attained by providing a bicycle rim comprising an outer annular surface, a pair of oppositely facing spoke attachment portions and an inner annular surface in which the spoke attachment portions have circumferentially arranged openings and a radially extending recess located inwardly adjacent each of the openings in the rims. The outer annular surface is configured to receive a tire thereon. The spoke attachment portions extend radially inwardly from the outer annular surface, while the inner annular surface extends between the spoke attachment portions.

The foregoing objects can also be attained by providing a bicycle spoke comprising an outer end portion, a center portion and an inner portion in which the outer end portion has a first predetermined width that is at least ten times the first predetermined thickness of the outer end portion. In particular, the outer end portion of the spoke is configured to be received within an opening formed in a rim. The outer end portion of each spoke has its first predetermined width extending in a first direction and its first predetermined thickness extending in a second direction, which is substantially perpendicular to the first direction. The first predetermined width of the outer end portion is at least ten times the first predetermined thickness of the outer end portion. The center portion is coupled to the outer end portion, and is located radially inwardly of the outer end portion. The center portion has a second predetermined width in the first direction and a second predetermined thickness in the second direction. The inner portion is coupled to the center portion, and is located radially inwardly of the center portion.

The present invention can be utilized in either front or rear wheels, and can have any number of spokes as needed and/or desired.

Other objects, advantages and salient features of the invention will become apparent from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
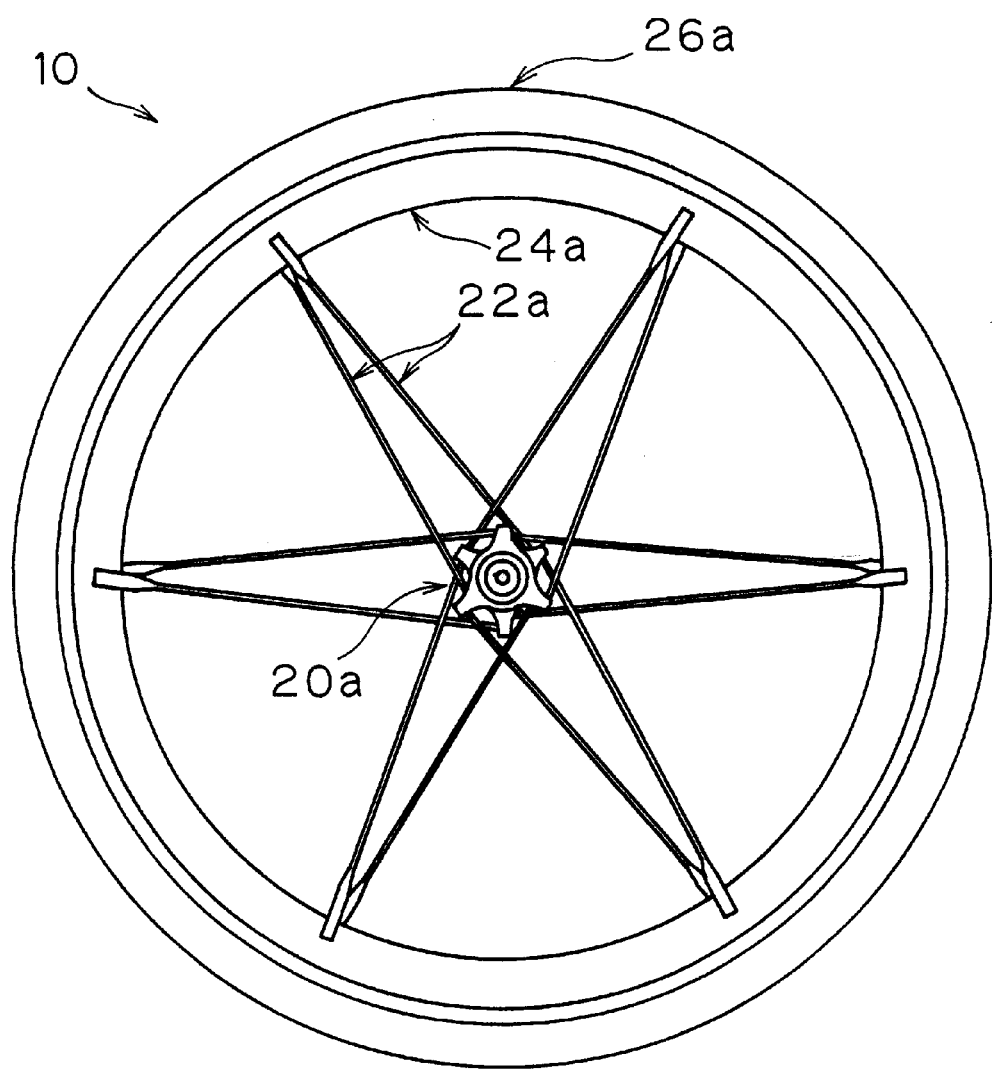
FIG. 1 is a side elevational view of a front bicycle wheel with a front hub, twelve spokes and a rim in accordance with a first embodiment of the present invention.
Figure 2:
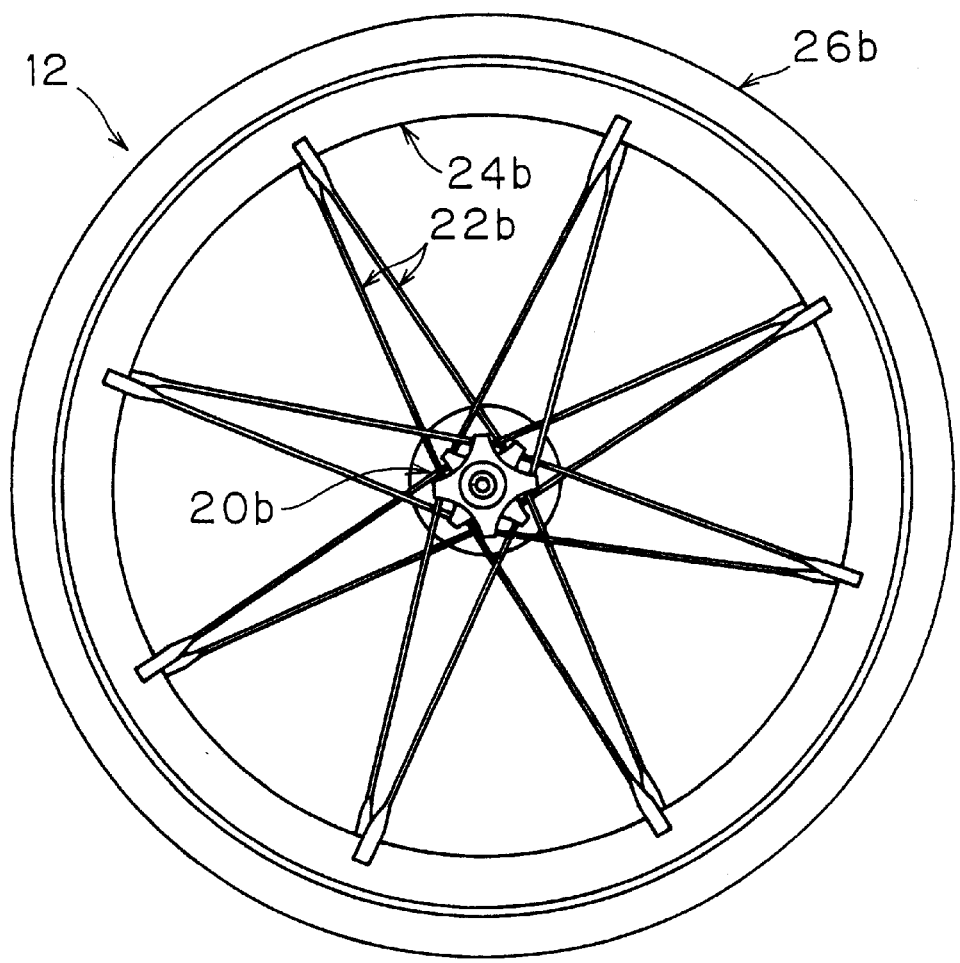
FIG. 2 is a side elevational view of a rear bicycle wheel with a rear hub, sixteen spokes and a rim in accordance with the first embodiment of the present invention.

Referring initially to FIGS. 1 and 2, a front bicycle wheel 10 is illustrated in accordance with one embodiment the present invention (FIG. 1), and a rear bicycle wheel 12 is illustrated in accordance with another embodiment the present invention (FIG. 2). Front wheel 10 has a central hub 20a, a plurality of outwardly extending spokes 22a and an annular rim 24a with a pneumatic tire 26a coupled thereto in a conventional manner. Similarly, rear bicycle wheel 12 has a rear hub 20b, a plurality of outwardly extending spokes 22b and an annular rim 24b with a pneumatic tire 26b coupled thereto in a conventional manner. Basically, the overall constructions of front bicycle wheel 10 and rear bicycle wheel 12 are substantially identical, except that rim and hub have been modified to accommodate a different number of spokes.

In the first embodiment shown herein, front bicycle wheel 10 has twelve spokes 22a, while rear bicycle wheel 12 has sixteen spokes 222b. Of course, it will be apparent to those skilled in the art from this disclosure that the front and rear wheels 10 and 12 can have the same number of spokes as well as fewer or more spokes than illustrated. In view of the similarities between front bicycle wheel 10 and rear bicycle wheel 12, only front bicycle wheel 10 will be discussed and illustrated in detail herein. Accordingly, it will be apparent to those skilled in the art from this disclosure that the description pertaining to the construction of front wheel 10 also applies to rear bicycle wheel 12.

Figure 3:
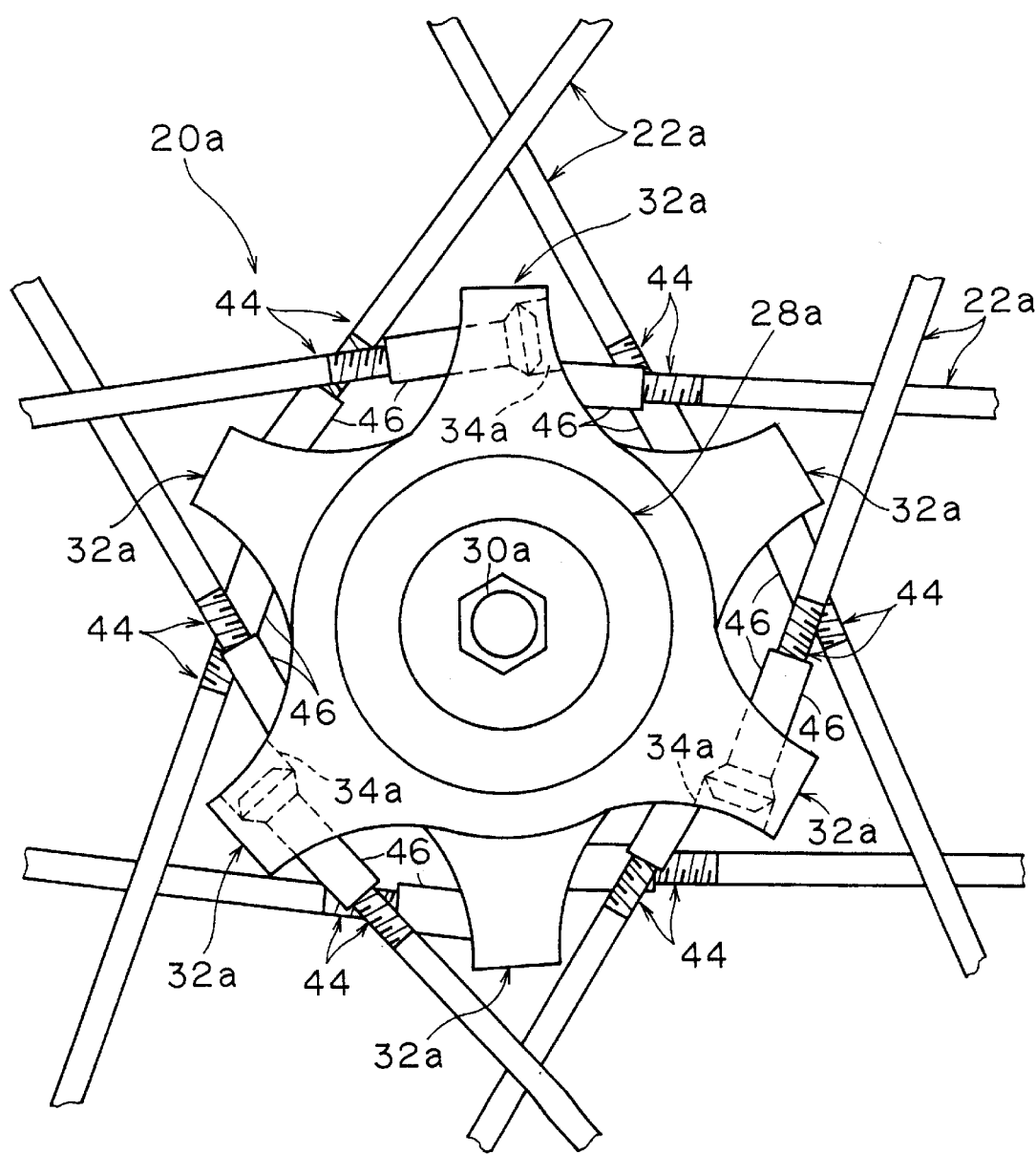
FIG. 3 is an enlarged elevational view of the front bicycle hub illustrated in FIG. 1 with the inner end portions of the spokes coupled thereto.
Figure 4:
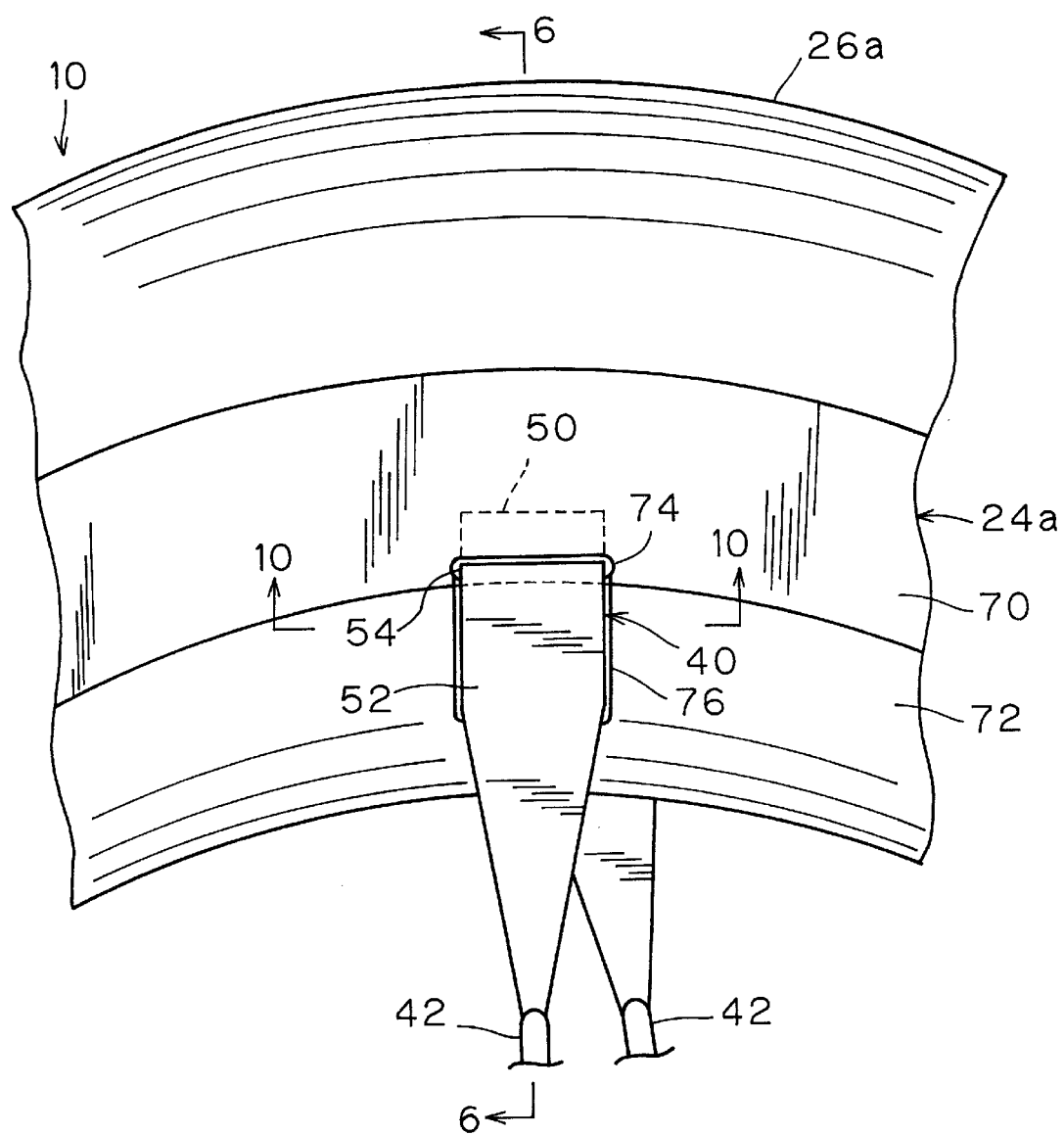
FIG. 4 is an enlarged, partial side elevational view of a portion of the front bicycle wheel illustrating the connection between the rim and two of the spokes of the bicycle wheel illustrated in FIG. 1.

Referring now to FIG. 3, front hub 20a has a cylindrical hub shell 28a that is rotatably supported on a hub axle 30a in a substantially conventional manner. The hub shell 28a has a pair of flanges located at its opposite ends, with three outwardly extending spoke attachment parts 32a on each flange. Spoke attachment parts 32a are designed to receive two spokes 22a therein as explained below. In particular, each spoke attachment part 32a preferably has a pair of stepped bores or through holes 34a for coupling a pair of spokes 22a to each of the spoke attachment parts 32a. Of course, each of the spoke attachment parts 32a could have fewer/more spokes 22a coupled thereto as needed and/or desired. The number and shape of the spoke attachment parts will depend upon the number of spokes and their shapes. Accordingly, it will be apparent to those skilled in the art from this disclosure that other types and shapes of hubs can be utilized in connection with the present invention.

The particular constructions of hubs 20a and 20b and their connection to spokes 22a are disclosed and discussed in more detail in copending patent application Ser. No. 08/784,460, filed on Jan. 16, 1997 in the name of Yasuhiro Yahata and assigned to Shimano Inc. The disclosure of patent application Ser. No. 08/784,460 is hereby incorporated herein by reference to explain the precise construction of hubs 20a and 20b and their interconnection to spokes 22a and 22b.

Spokes 22a and 22b are preferably identical, and thus, only spokes 22a will be shown and discussed in detail herein. Spokes 22a are preferably constructed of a conventional metallic material utilized in construction of spokes, such as plated steel, stainless steel, aluminum or carbon fiber composite. Of course, it will be apparent to those skilled in the art from this disclosure that other suitable materials can be utilized as needed and/or desired.

Spokes 22a extend from the left and right ends of the hub 20a towards the rim 24a. In other words, in a twelve spoke embodiment, six spokes extend substantially outwardly from the right end of hub 20a to rim 24a and six spokes extend substantially outwardly from the left end of hub 20a to rim 24a. Spokes 22a are preferably tangentially arranged relative to hub 20a as they extend outwardly therefrom. Of course, spokes 22a can be arranged in a more radial direction if needed and/or desired.

As seen in FIGS. 6–9, each of the spokes 22a has an outer end portion 40, a center portion 42 and an inner end portion 44. Outer end portion or spoke head 40 is coupled to rim 24a. Straight center portion 42 is located radially inwardly of outer end portion 40, and inner end portion 44 located radially inwardly of the center portion 42. Center portion 42 is coupled to hub 20a in a relatively conventional manner. Preferably, outer end portion 40, center portion 42 and inner end portion 44 are constructed as a unitary, one-piece member with spoke nipples 46 theadedly coupled to the inner end portion 44 of each of the spokes 22a for connection to hub 20a.

As shown in FIGS. 6–9, outer end portion 40 of each spoke 22a has a first predetermined width W and a first predetermined thickness T. The width W of outer end portion 40 of each spoke 22a extends in a first direction, while the thickness T of outer end portion 40 of each spoke 22a extends in a second direction, which is substantially perpendicular to the first direction. The outer end portion 40 has a width W that is preferably at least ten times the thickness T of the outer end portion 40. Preferably, outer end portion 40 has a width W that is approximately thirty times the thickness T of the outer end portion 40. For example, the outer end portions 40 of spokes 22a can have widths of approximately 15.0 millimeters and thicknesses of approximately 0.5 millimeters.

In the first embodiment, outer end portions 40 of spokes 22a have an elongated cross section such as a rectangular or an elongated elliptical cross section, while center portions 42 and inner end portions 44 each have a circular or elliptical cross section. Of course, it will be apparent to those skilled in the art that the entire length of spokes 22a can be substantially uniform along its entire cross section if needed and/or desired. It will also be apparent to those skilled in the art that constant cross section spokes can be utilized or spokes with a varying cross section can be utilized as needed and/or desired. For example, spokes with an elliptical cross section could be used in accordance with the present invention. In any event, outer end portion 40 has a width W that is preferably at least ten times the thickness T of the outer end portion 40. Preferably, outer end portion 40 has a width W that is at least thirty times the thickness T of the outer end portion 40.

As seen in FIGS. 6–9, outer end portions 40 of spokes 22a are bent to form first sections 50 at the free ends of spokes 22a which are offset from the second sections 52. This offsetting of the first and second section 50 and 52 forms a bend or offset section 54 therebetween, which retains the spoke 22a to rim 24a as discussed below. Preferably, second sections 52 of each spoke 22a lies substantially in the same plane as its respective center portion. First section 50, on the other hand, lies in a plane, which is spaced from the plane of the second section 52 and preferably parallel thereto. Of course, it will be apparent to those skilled in the art from this disclosure that first section 50 can be bent or formed to have a different shape and/or cross section than the illustrated shapes and cross sections. In any event, the shapes and cross sections of first section 50, second section 52 and bend or offset section 54 of each spoke should be configured to prevent axial movement of the spoke relative to rim 24a when the spoke is in the installed position.

As seen in FIGS. 4–9, first section 50 of each spoke 22a has a first contact surface 56 facing in a first direction to engage an inner surface of rim 24a. Second section 52 of each spoke 22a has a second contact surface 58 facing in a second direction to engage the outer surface of rim 24a. The lateral spacing between first contact surface 56 of first section 50 and second contact surface 58 is preferably slightly larger than the thickness of rim 24a. Accordingly, when spokes 22a are installed in rim 24a, spokes 22a engage rim 24a to prevent any substantial movement therebetween.

Optionally, additional fastening means such as an adhesive or cement or the like can be utilized to more firmly and fixedly secure outer end portions 40 of spokes 22a to the spoke attachment portions of the annular rim 24a. The term "adhesive" as used herein, including the claims, includes any compound or material which can be used to secure to materials together including cements and the like. Moreover, fasteners or fastening means (not shown), such as spot welding, rivets or threaded fasteners or the like, can be utilized if needed and/or desired. Such fasteners can extend through either first contact surface 56 or second contact surface 58, and into the side portions of rim 24a. In addition, fasteners can be used in conjunction with adhesive or the like.

Center portions 42 of spokes 22a are illustrated as being substantially straight wire type spokes with a substantially elliptical cross section. However, it will be apparent to those skilled in the art from this disclosure that center portions 42 of spokes 22a can be configured to have other types of cross sections and/or shapes. For example, center portions 42 can be more rectangular in cross section with the shape being uniformed along the entire length of center portion 42. Alternatively, the cross section of center portion 42 can vary along its length such that the cross section of center portion 42 becomes wider as it approaches hub 24a. In other words, the thickness and/or width of center portion 42 can be either uniformed or varied as needed and/or desired.

Inner end portions 44 of spokes 22a are threaded for receiving conventional spoke nipples 46 thereon. More specifically, inner end portions 44 of spokes 22a are inserted through one end of bores 34a of hub 20a, and then spoke nipples 46a are inserted through the other end of bores 34a. The headed or flanged portion of the spoke nipples 46 engage an internal abutment surface of bores 34 to fixedly secure inner end portions 44 of spokes 22a to hub 20a. Accordingly, spokes 22a can be tightened in a substantially conventional manner between hub 20a and rim 24a to secure inner end portions 44 of spokes 22a thereto.

Rim 24a is a so-called deep rim in which the rim height is greater than the rim width and is designed to have pneumatic tire 26a fastened thereto by a tire cement. Of course, rim 24a can have other shapes to accommodate other types of tires as needed and/or desired without departing from the scope of the present invention. Annular rim 24a is constructed of a substantially rigid material, such as those materials, which are well known in the art. For example, rims 24a can be constructed of any suitable metallic material, such as plated steel, stainless steel, aluminum or titanium, as well as other non-metallic materials, such as a carbon fiber composite, which can be utilized for a bicycle wheel.

Figure 5:
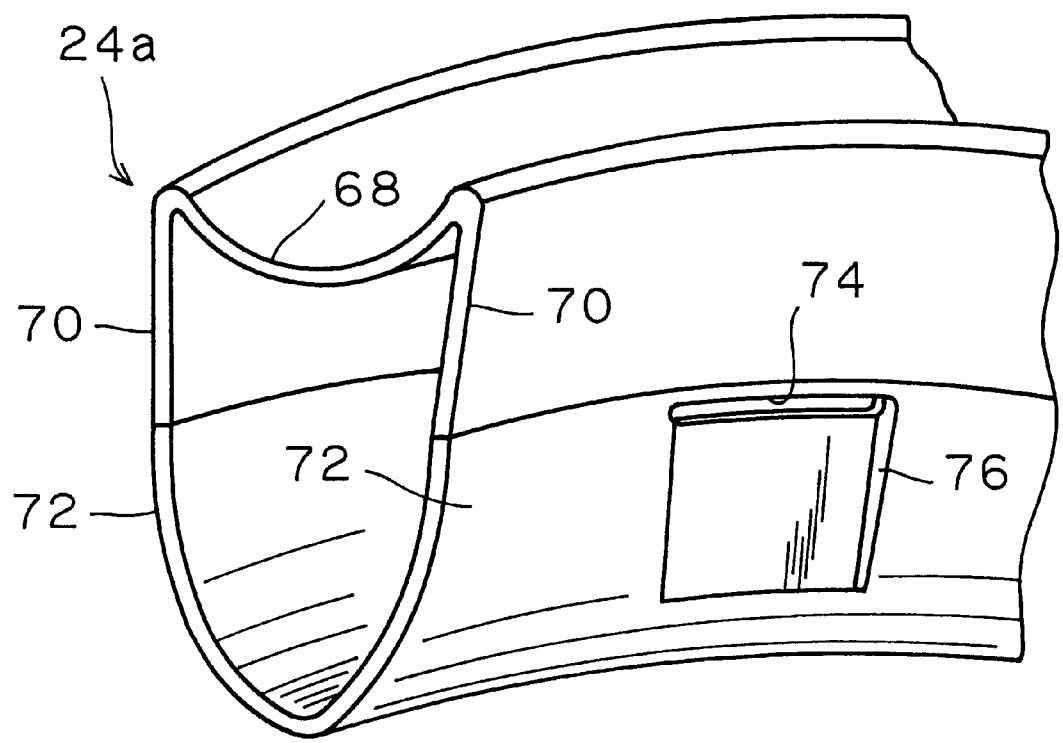
FIG. 5 is an enlarged, partial perspective view of a portion of the front the bicycle rim in accordance with the first embodiment of the present invention.
Figure 6:
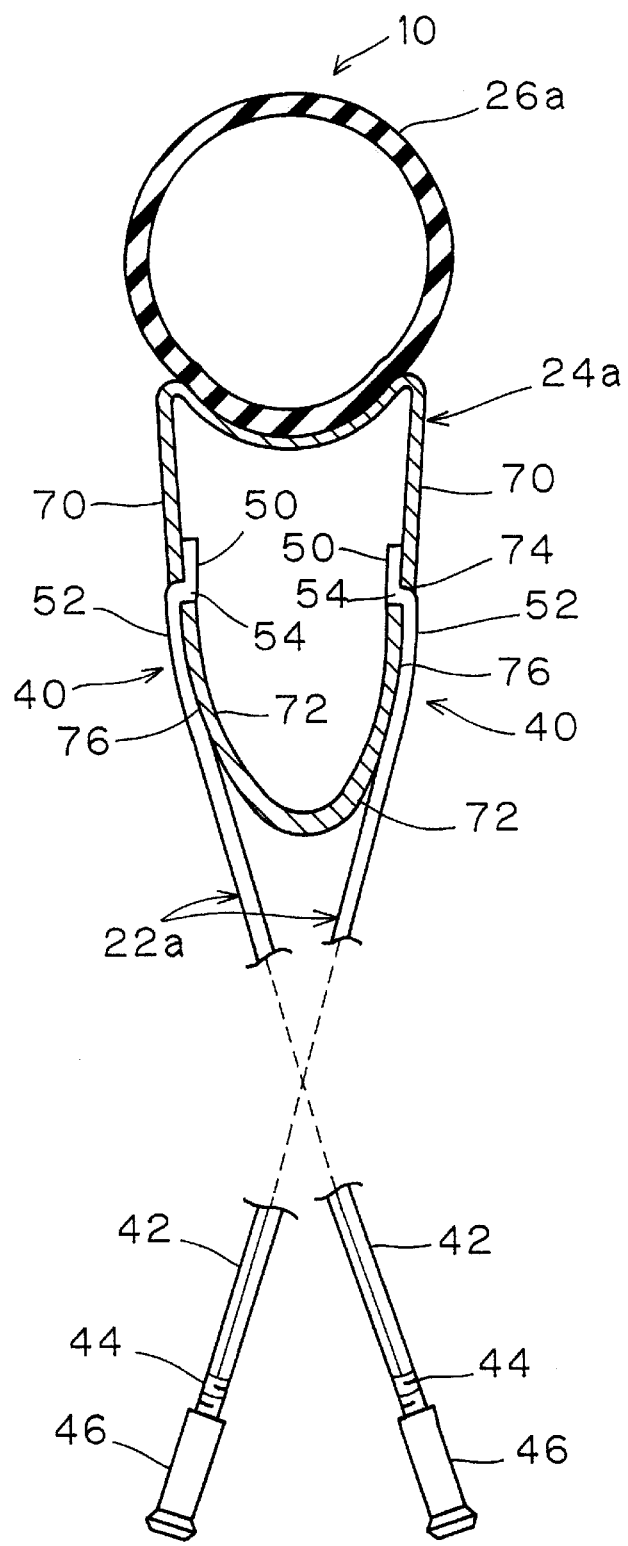
FIG. 6 is a partial, cross-sectional view of the bicycle rim as seen along section line 6—6 of FIG. 4 with two of the spokes of the bicycle wheel illustrated in elevation.
Figure 7:
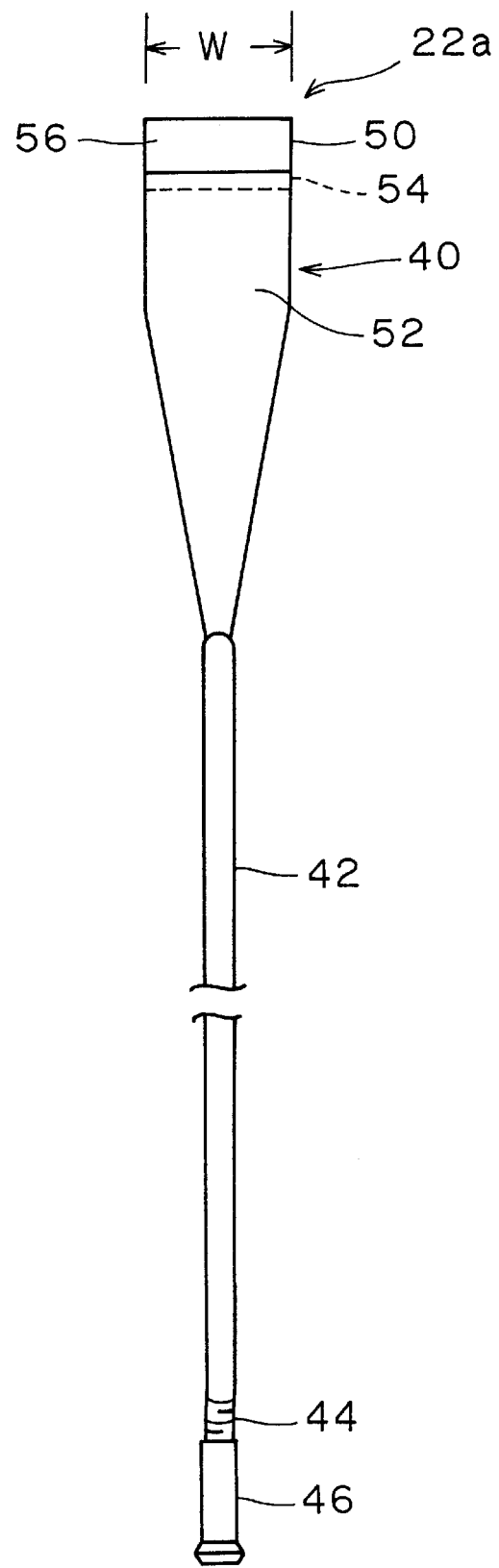
FIG. 7 is an enlarged, partial side elevational view of the spoke illustrated in FIGS. 1–6 in accordance with the first embodiment of the present invention.
Figure 8:
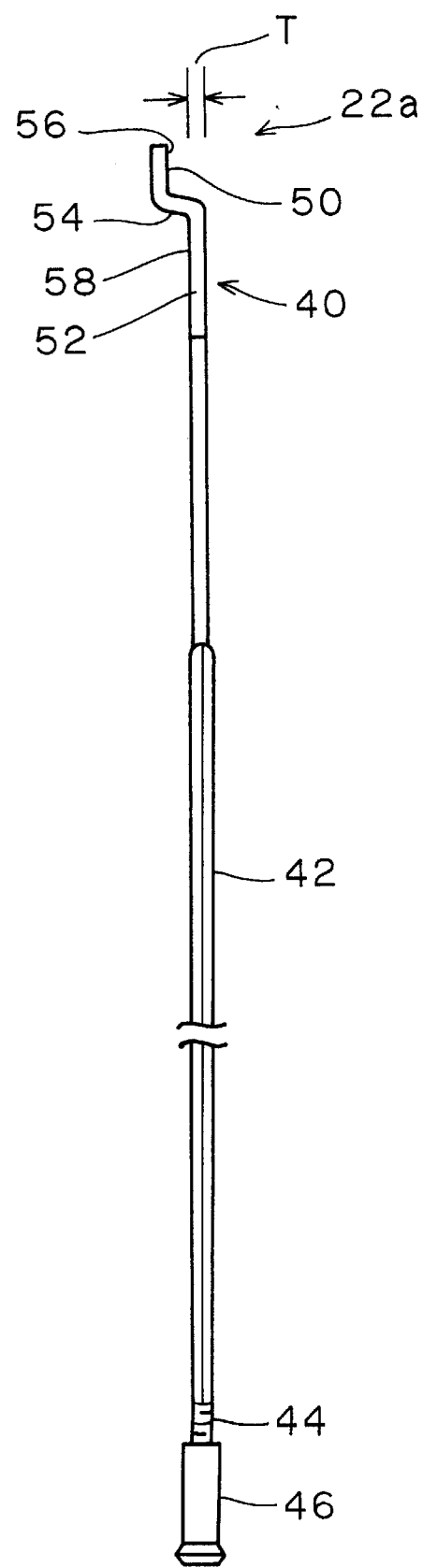
FIG. 8 is an enlarged, partial edge elevational view of the spoke illustrated in FIGS. 7 in accordance with the first embodiment of the present invention.
Figure 9:
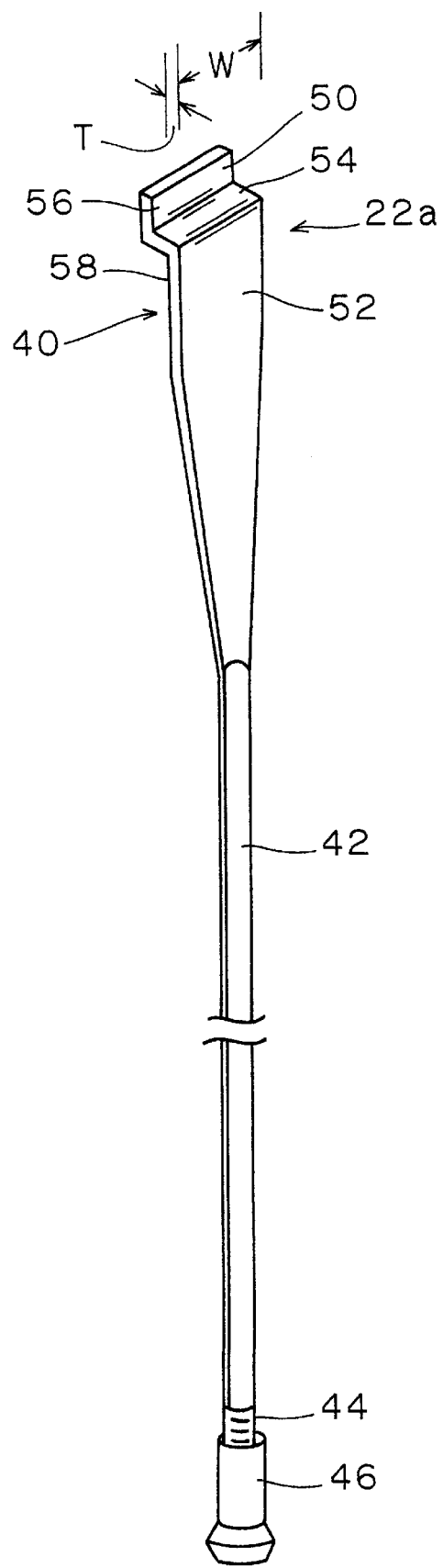
FIG. 9 is an enlarged perspective view of one of the spokes utilized in the bicycle wheels illustrated in FIGS. 7 and 8 in accordance with the first embodiment of the present invention.

Rim 24a is substantially circular as seen in side elevation (FIG. 1), and has an outer annular surface 68, a pair of annular braking portions 70 and a pair of annular spoke attachment portions 72. The outer annular surface 68 is adapted to receive pneumatic tire 26a thereon. The annular braking portions 70 are located on the sides of rim 24a. The annular spoke attachment portions 72 are also located on the sides of rim 24a, radially inward of annular braking portions 70 as seen in FIG. 5. Rim 24a is a tubular member with a hollow, annular inner area. It will be apparent to those skilled in the art that the shape of outer annular surface 68 of rim 24a could be modified to accommodate different types of tires such as "clinchers" as needed and/or desired. In the preferred embodiment, outer annular surface 68 of rim 24a is designed for use with "tubular" or "sew-up" type tires which are cemented to outer annular surface 68.

Braking portions 70 are preferably substantially flat, circular surfaces which are designed to be engaged with the brake pads of a brake device for slowing or stopping rotation of wheel 10. Braking portions 70 are preferably parallel to each other and located between outer annular surface 68 and one of the spoke attachment portions.

Spoke attachment portions 72 are located radially inwardly relative to outer annular surface 68 and braking portions 70 of the rim 24a. Preferably, spoke attachment portions 72 are angled towards each other to form a substantially V-shaped section of rim 24a with its apex pointed towards the center of wheel 10. Each spoke attachment portion 72 has a plurality of openings 74 for receiving first sections 50 of the spokes 22a therein and a plurality of radial recesses 76 for receiving at least parts of outer portions 40 therein.

Openings 74 and radial recesses 76 are preferably equally spaced about spoke attachment portions 72, with radial recesses 76 being located radially inwardly of openings 74. In this first embodiment, the plurality of openings 74 are preferably elongated openings or slots which are sized and shaped to receive the outer end portions of the spokes therein. Elongated openings 74 distribute the forces on rim 24a over a greater area than ordinary round spokes such that stress fracturing and/or tearing of rim 24a is minimized. Preferably, openings 74 have circumferential lengths of at least approximately 5.0 millimeters. For example, if outer end portions 40 of spokes 22a have widths of approximately 15.0 millimeters and thicknesses of approximately 0.5 millimeters, then openings 74 preferably have circumferential lengths of approximately 17.0 millimeters and radial widths of approximately 0.7 millimeters.

Preferably, openings 74 are spaced from the innermost edge of rim 24a by at least 5.0 millimeters to increase the resistance of damage to rim 24a. Preferably, the radial distance from the inner edge of openings 74 to the innermost edge of rim 24a is at least one third the circumferential length of opening 74. The farther openings 74 can be spaced from the inner peripheral edge of rim 24a, the stronger the connection between spokes 22a and rim 24a. The radial widths of openings 74a are preferably substantially equal to or slightly greater than the widths of spokes 22a so that debris, dirt and the like does not enter the hollow area of rim 24a.

In a preferred embodiment, the thickness of spokes 22a at first end sections 50 is in the range of approximately 0.5 millimeters to approximately 3.0 millimeters. Accordingly, openings 74 can have a radial width in the range of approximately 0.5 millimeters to approximately 5.0 millimeters. For example, if the thickness of first end section 50 of each spoke 22a is approximately 1.0 millimeters then the radial width of each opening 74 can be approximately 1.2 millimeters.

Figure 10:
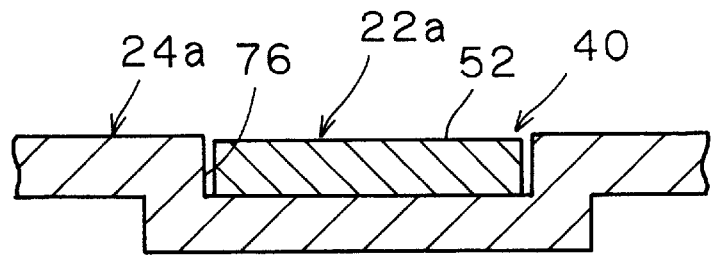
FIG. 10 is an enlarged, partial cross-sectional view of the bicycle rim and one of the bicycle spokes as seen along section line 10—10 of FIG. 4 in accordance with the first embodiment of the present invention.

As seen in FIG. 10, recesses 76 have axial depths, which are preferably substantially equal to the thickness of second section 52 of outer portion 40. This arrangement provides a more aerodynamic design to reduce air resistance.

In the preferred embodiments of the present invention, first end sections 50 and bend sections 54 are configured to freely pass through openings 74 of rim 24a. Thus, this configuration makes it unnecessary to have either center portion 42 or inner end portion 44 of each spoke pass through openings 74. Moreover, openings 74 are preferably configured to be substantially the same shape as the cross section of bend sections 54 of spokes 22a and only slightly larger as mentioned above. Thus, when spokes 22a are in the installed position, openings 74 limit circumferential movement of the bend sections 54 therein. In particular, the shapes and cross sections of first section 50, second section 52 and bend section 54 of each spoke should be configured to prevent axial movement of the spoke relative to rim 24a when the spoke is in the installed position.

Second Embodiment

Figure 11:
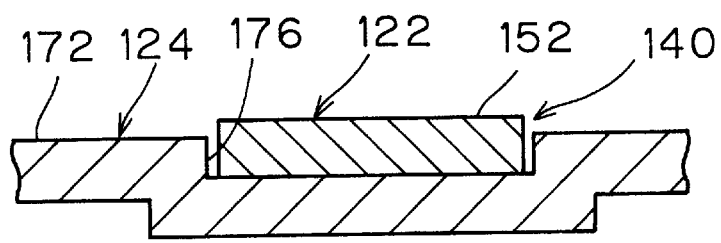
FIG. 11 is an enlarged, partial cross-sectional view, similar to FIG. 10, of a modified bicycle rim and one of the bicycle spokes as in accordance with a second embodiment of the present invention.

As seen in FIG. 11, a partial cross sectional view of a bicycle rim 124 is illustrated in accordance with the present invention. This embodiment is substantially similar to the first embodiment of FIGS. 1–10, except that the depth each of the recesses 176 has been decreased. Accordingly, the outer end portions 140 of the spokes 122 are not flush with the outer surfaces of the spoke attachment portions 172. Rather, the outer end portions 140 of the spokes 122 protrude outwardly from the outer surface of the spoke attachment portions 172. In particular, recesses 176 of rim 124 have axial depths, which are less than the thicknesses of second sections 152 of outer portions 140. This arrangement provides an aerodynamic design, which reduces air resistance.

In view of the similarities of this embodiment with first embodiment of the present invention, this embodiment will not be discussed or illustrated in further detail herein. Rather, the description of the parts of the first embodiment explaining the present invention applies to this embodiment.

Third Embodiment

Figure 12:
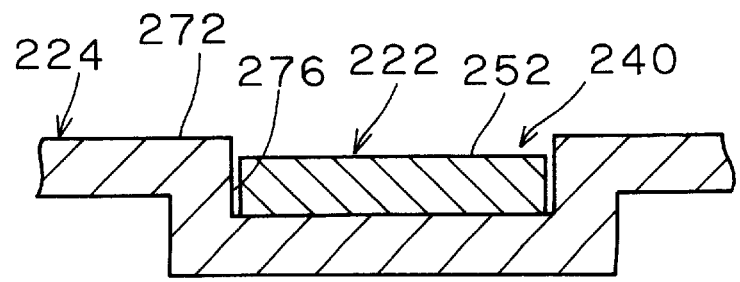
FIG. 12 is a partial, cross-sectional view, similar to FIGS. 10 and 11, of a modified of the bicycle rim and one of the bicycle spokes in accordance with a third embodiment of the present invention.

As seen in FIG. 12, a partial cross-sectional view of a bicycle rim 224 is illustrated in accordance with the present invention. This embodiment is substantially similar to the first embodiment of FIGS. 1–10, except that the depth each of the recesses has been increased. Accordingly, the outer end portions 240 of the spokes 222 are not flush with the outer surfaces of the spoke attachment portions 272. Rather, the outer end portions 240 of the spokes 222 are recessed from the outer surface of spoke attachment portion 272. In particular, recesses 276 of rim 224 have axial depths, which are greater than the thicknesses of second sections 252 of outer portions 240. This arrangement provides an aerodynamic design, which reduces air resistance.

In view of the similarities of this embodiment with first embodiment of the present invention, this embodiment will not be discussed or illustrated in detail herein. Rather, the description of the parts of the first embodiment explaining the present invention applies to this embodiment.

Fourth Embodiment

Figure 13:
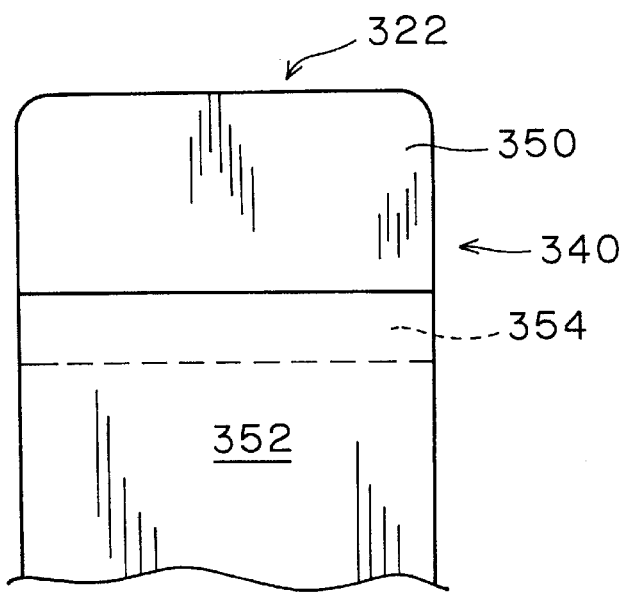
FIG. 13 is a partial, side elevational view of a modified bicycle spoke in accordance with a fourth embodiment of the present invention.
Figure 14:
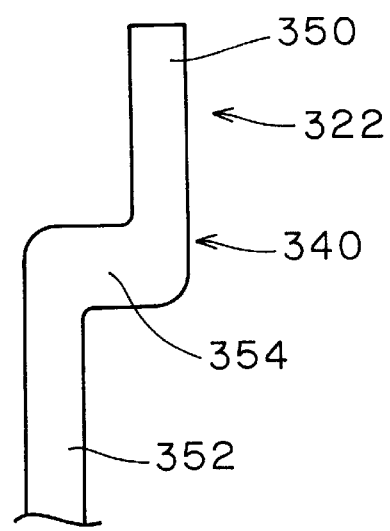
FIG. 14 is a partial, edge elevational view of the modified bicycle spoke in accordance with the fourth embodiment of the present invention.
Figure 15:
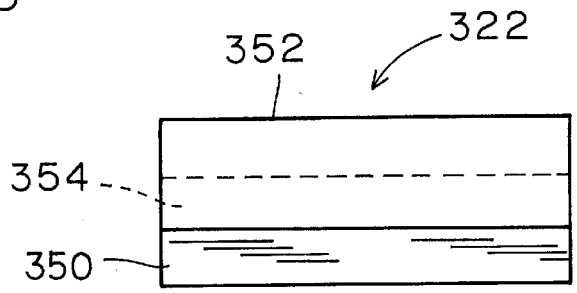
FIG. 15 is an end elevational view of the modified bicycle spoke in accordance with the fourth embodiment of the present invention.

Referring now to FIGS. 13–15, a modified spoke 322 is illustrated in accordance with another aspect of the present invention. Spokes 322 is designed to be used with either wheel 10 or 12. In other words, spoke 322 extends between hub 20a or 20b and rim 24a or 24b. Similar to the first embodiment, spoke 322 has an outer end portion 340, a substantially straight center portion (not shown) and an inner end portion (not shown). Preferably, outer end portion 340, center portion and inner end portion are constructed as a one-piece, unitary member with a connection member or spoke nipple coupled to inner end portion for connection to hub 20a or 20b.

Outer end portion 340 of spokes 322 is bent to form a first section 350 and second sections 352 at the free end of spoke 322. This offsetting of the first and second section 350 and 352 forms a bend or offset section 354 therebetween, which retains the spoke 322 to rim 24a or 24b. In other words, first section 350 is offset from the second section 352 by offset section 354, which extends substantially perpendicular to first and second sections 350 and 352. Preferably, second sections 352 of each spoke 322 lies substantially in the same plane as its respective center portion. First section 350, on the other hand, lies in a plane, which is spaced from the plane of the second section 352 and preferably parallel thereto. Of course, it will be apparent to those skilled in the art from this disclosure that first section 350 can be bent or formed to have a different shape and/or cross section than the illustrated shapes and cross sections. In any event, the shapes and cross sections of first section 350, second section 352 and bend section 354 of each spoke should be configured to prevent axial movement of the spoke 322 relative to rim 24a or 24b, when the spoke 322 is in the installed position.

Since spoke 322 is normally in tension, bend or offset section 354 applies a force to rim 24a or 24b and vice-a-versa. Thus, in this embodiment, bend or offset section 354 is thicker than either first section 350 or second section 352.

Optionally, additional fastening means such as an adhesive or cement or the like can be utilized to more firmly and fixedly secure outer end portions 340 of spokes 322 to the spoke attachment portions of the annular rim 24a or 24b. The term "adhesive" as used herein, including the claims, includes any compound or material which can be used to secure to materials together including cements and the like. Moreover, fasteners or fastening means (not shown), such as spot welding, rivets or threaded fasteners or the like, can be utilized if needed and/or desired. In addition, fasteners can be used in conjunction with adhesive or the like.

In view of the similarities of this embodiment with prior embodiments of the present invention, this embodiment will not be discussed or illustrated in detail herein. Rather, the description of the previous embodiments explaining the present invention applies to this embodiment.

Fifth Embodiment

Figure 16:
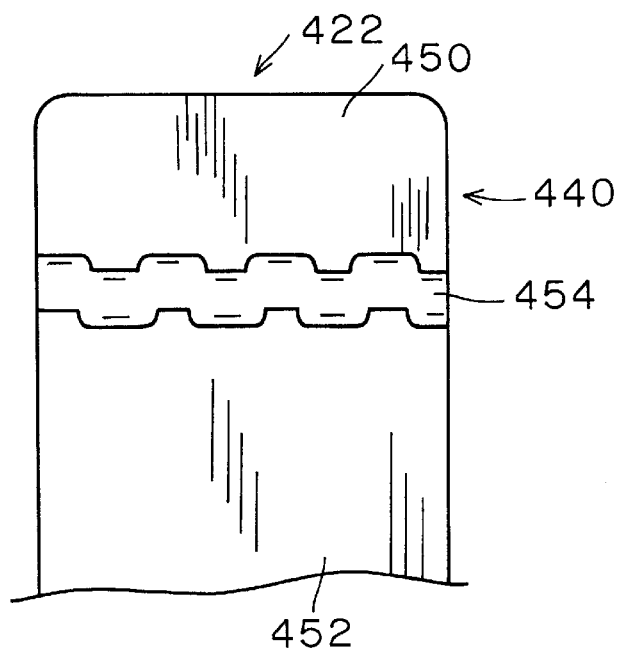
FIG. 16 is a partial, side elevational view of a modified bicycle spoke in accordance with a fifth embodiment of the present invention.
Figure 17:
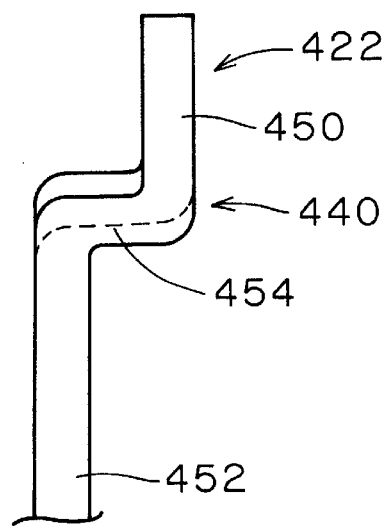
FIG. 17 is a partial, edge elevational view of the modified bicycle spoke in accordance with the fifth embodiment of the present invention.
Figure 18:
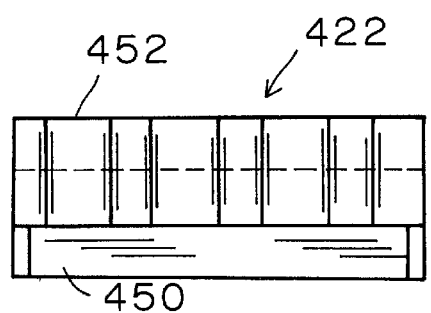
FIG. 18 is an end elevational view of the modified bicycle spoke in accordance with the fifth embodiment of the present invention.

Referring now to FIGS. 16–18, a modified spoke 422 is illustrated in accordance with another aspect of the present invention. Spokes 422 is designed to be used with either wheel 10 or 12. In other words, spoke 422 extends between hub 20a or 20b and rim 24a or 24b. Similar to the first embodiment, spoke 422 has an outer end portion 440, a substantially straight center portion (not shown) and an inner end portion (not shown). Preferably, outer end portion 440, center portion and inner end portion are constructed as a one-piece, unitary member with a connection member or spoke nipple coupled to inner end portion for connection to hub 20a or 20b.

Outer end portion 440 of spokes 422 is bent to form a first section 450 and second sections 452 at the free end of spoke 422. This offsetting of the first and second section 450 and 452 forms a bend or offset section 454 therebetween, which retains the spoke 422 to rim 24a or 24b. In other words, first section 450 is offset from the second section 452 by offset section 454, which extends substantially perpendicular to first and second sections 450 and 452. Preferably, second sections 452 of each spoke 422 lies substantially in the same plane as its respective center portion. First section 450, on the other hand, lies in a plane, which is spaced from the plane of the second section 452 and preferably parallel thereto. Of course, it will be apparent to those skilled in the art from this disclosure that first section 450 can be bent or formed to have a different shape and/or cross section than the illustrated shapes and cross sections. In any event, the shapes and cross sections of first section 450, second section 452 and bend section 454 of each spoke should be configured to prevent axial movement of the spoke 422 relative to rim 24a or 24b, when the spoke 422 is in the installed position.

Since spoke 422 is normally in tension, bend or offset section 454 applies a force to rim 24a or 24b and vice-a-versa. Thus, in this embodiment, bend or offset section 454 is corrugated for additional strength. By corrugating offset section 454, the effective thickness of offset section 454 is greater than the effective thickness of either first section 450 or second section 452.

Optionally, additional fastening means such as an adhesive or cement or the like can be utilized to more firmly and fixedly secure outer end portions 440 of spokes 422 to the spoke attachment portions of the annular rim 24a or 24b. The term "adhesive" as used herein, including the claims, includes any compound or material which can be used to secure to materials together including cements and the like. Moreover, fasteners or fastening means (not shown), such as spot welding, rivets or threaded fasteners or the like, can be utilized if needed and/or desired. In addition, fasteners can be used in conjunction with adhesive or the like.

In view of the similarities of this embodiment with prior embodiments of the present invention, this embodiment will not be discussed or illustrated in detail herein. Rather, the description of the previous embodiments explaining the present invention applies to this embodiment.

While particular embodiments have been chosen to illustrate the present invention, it will be understood by those skilled in the art that various changes and modifications can be made herein without departing from the scope of the invention as defined in the appended claims. Furthermore, the foregoing descriptions of the preferred embodiments of the present invention are provided for illustration only, and not for the purpose of limiting the invention as defined by the appended claims and their equivalents.

What is claimed is:

1. A spoked rim assembly, comprising:

an annular rim having an outer annular surface configured to receive a tire thereon, a pair of oppositely facing spoke attachment portions extending radially inwardly from said outer annular surface, and an inner annular surface extending between said spoke attachment portions, said spoke attachment portions being provided with a plurality of circumferentially arranged openings and a radially extending recess located inwardly adjacent said openings; and a plurality of inwardly extending spokes with each of said spokes having an outer end portion at least partially positioned within one of said openings and one of said recesses of said annular rim, a center portion located radially inwardly of said outer end portion, and an inner end portion located radially inwardly of said center portion.

2. A spoked rim assembly according to claim 1, wherein each of said outer end portions of said spokes has a first section and a second section coupled to said first section by an offset section such that said first sections are offset from second sections to retain said outer end portions within said openings of said spoke attachment portions of said rim.

3. A spoked rim assembly according to claim 1, wherein said outer end portions of said spokes each have an outwardly facing surface, which is substantially flush with external surfaces of said spoke attachment portions located circumferentially adjacent said recesses of said spoke attachment portions.

4. A spoked rim assembly according to claim 1, wherein said outer end portions of said spokes each have an outwardly facing surface, which is recessed below external surfaces of said spoke attachment portions located circumferentially adjacent said recesses of said spoke attachment portions.

5. A spoked rim assembly according to claim 1, wherein each of said outer end portions of said spokes has a predetermined thickness, which is larger than the depth of said recesses of said spoke attachment portions.

6. A spoked rim assembly according to claim 2, wherein said first and second sections of said outer end portions of said spokes are thinner than said offset sections of said outer end portions of said spokes.

7. A spoked rim assembly according to claim 2, wherein said offset sections of said outer end portions of said spokes are corrugated.

8. A spoked rim assembly according to claim 1, wherein each of said outer end portions has a first predetermined width extending in a first direction and a first predetermined thickness extending in a second direction, which is substantially perpendicular to said first direction, said first predetermined width of said outer end portion being at least ten times said first predetermined thickness of said outer end portion.

9. A spoked rim assembly according to claim 2, wherein said first sections of said outer end portions of said spokes have an elongated cross section, and said openings of said rim are elongated slots.

10. A spoked rim assembly according to claim 9, wherein said elongated cross sections of said first sections of said outer end portions are substantially identical or smaller in cross section than said openings of said rim to allow said first sections to pass therethrough.

11. A spoked rim assembly according to claim 1, wherein said inner end portions of said spokes have threads thereon.

12. A spoked rim assembly according to claim 1, wherein said inner end portions of said spokes include abutments for engaging a part of a hub.

13. A spoked rim assembly according to claim 12, wherein said abutments are part of spoke nipples which are adjustably coupled to said inner end portions of said spokes for longitudinal adjustment of the spokes.

14. A spoked rim assembly according to claim 1, wherein each of said spoke attachment portions of said annular rim has an annular bulged section located radially inwardly of said openings, said bulged section having a width which is larger than the width of said rim along said openings.

15. A spoked rim assembly, comprising:

an annular hollow rim having an outer annular surface configured to receive a tire thereon, a pair of oppositely facing spoke attachment portions extending radially inwardly from said outer annular surface, and an inner annular surface extending between said spoke attachment portions to form an innermost radial edge of said rim, said spoke attachment portions being provided with a plurality of circumferentially arranged openings having circumferential lengths to form elongated slots, said openings being spaced outwardly from said innermost radial edge of said rim by a distance of at least one third said circumferential lengths of said openings; and a plurality of inwardly extending spokes with each of said spokes having an outer end portion configured to be received within one of said openings of said rim, a center portion coupled to said outer end portion and located radially inwardly of said outer end portion, and an inner end portion coupled to said center portion and located radially inwardly of said center portion, said outer end portion having a first predetermined width extending in a first direction and a first predetermined thickness extending in a second direction which is substantially perpendicular to said first direction, with said first predetermined width of said outer end portion being at least ten times said first predetermined thickness of said outer end portion, said center portion having a second predetermined width in said first direction and a second predetermined thickness in said second direction.

16. A spoked rim assembly, comprising:

an annular rim having an outer annular surface configured to receive a tire thereon, a pair of oppositely facing spoke attachment portions extending radially inwardly from said outer annular surface, and an inner annular surface extending between said spoke attachment portions, said spoke attachment portions being provided with a plurality of circumferentially arranged openings; and a plurality of inwardly extending spokes with each of said spokes having an outer end portion configured to be received within an opening of a rim, a center portion coupled to said outer end portion and located radially inwardly of said outer end portion, and an inner end portion coupled to said center portion and located radially inwardly of said center portion, said outer end portion having a first predetermined width extending in a first direction and a first predetermined thickness extending in a second direction which is substantially perpendicular to said first direction, with said first predetermined width of said outer end portion being at least ten times said first predetermined thickness of said outer end portion, each of said outer end portions of said spokes having a first section and a second section coupled to said first section by an offset section such that said first sections are offset from second sections to retain said outer end portions within said openings of said spoke attachment portions of said rim, said center portion having a second predetermined width in said first direction and a second predetermined thickness in said second direction.

17. A spoked rim assembly according to claim 16, wherein said spoke attachment portions is provided with a plurality of circumferentially arranged recesses located inwardly adjacent said openings, said outer end portions of said spokes being at least partially positioned within said recesses of said annular rim.

18. A spoked rim assembly according to claim 17, wherein said outer end portions of said spokes each have an outwardly facing surface, which is substantially flush with external surfaces of said spoke attachment portions located circumferentially adjacent said recesses of said spoke attachment portions.

19. A spoked rim assembly according to claim 17, wherein said outer end portions of said spokes each have an outwardly facing surface, which is recessed below external surfaces of said spoke attachment portions located circumferentially adjacent said recesses of said spoke attachment portions.

20. A spoked rim assembly according to claim 17, wherein each of said outer end portions of said spokes has a predetermined thickness, which is larger than the depth of said recesses of said spoke attachment portions.

21. A spoked rim assembly according to claim 16, wherein said first and second sections of said outer end portions of said spokes are thinner than said offset sections of said outer end portions of said spokes.

22. A spoked rim assembly according to claim 16, wherein said offset sections of said outer end portions of said spokes are corrugated.

23. A spoked rim assembly according to claim 16, wherein said first sections of said outer end portions of said spokes have an elongated cross section, and said openings of said rim are elongated slots.

24. A spoked rim assembly according to claim 23, wherein said elongated cross sections of said first sections of said outer end portions are substantially identical or smaller in cross section than said openings of said rim to allow said first sections to pass therethrough.

25. A spoked rim assembly according to claim 15, wherein said inner end portions of said spokes have threads thereon.

26. A spoked rim assembly according to claim 15, wherein said inner end portions of said spokes include abutments for engaging a part of a hub.

27. A spoked rim assembly, comprising:

an annular rim having an outer annular surface configured to receive a tire thereon, a pair of oppositely facing spoke attachment portions extending radially inwardly from said outer annular surface, and an inner annular surface extending between said spoke attachment portions, said spoke attachment portions being provided with a plurality of circumferentially arranged openings; and a plurality of inwardly extending spokes with each of said spokes having an outer end portion configured to be received within an opening of a rim, a center portion coupled to said outer end portion and located radially inwardly of said outer end portion, and an inner end portion coupled to said center portion and located radially inwardly of said center portion, said outer end portion having a first predetermined width extending in a first direction and a first predetermined thickness extending in a second direction which is substantially perpendicular to said first direction, with said first predetermined width of said outer end portion being at least ten times said first predetermined thickness of said outer end portion, said center portion having a second predetermined width in said first direction and a second predetermined thickness in said second direction, said inner end portions of said spokes including abutments for engaging a part of a hub, said abutments being part of spoke nipples which are adjustably coupled to said inner end portions of said spokes for longitudinal adjustment of the spokes.

28. A spoked rim assembly according to claim 15, wherein each of said spoke attachment portions of said annular rim has an annular bulged section located radially inwardly of said openings, said bulged section having a width which is larger than the width of said rim along said openings.

29. A spoked rim assembly according to claim 15, wherein said openings of said rim have circumferential lengths of at least approximately 5.0 millimeters.

30. A spoked rim assembly according to claim 15, wherein said openings of said rim have radial widths ranging from approximately 0.5 millimeters to approximately 2.0 millimeters.

15

31. A spoked rim assembly according to claim 30, wherein
said openings of said rim have circumferential lengths of at least approximately 5.0 millimeters.
32. A bicycle rim according to claim 15, wherein
said rim includes an annular hollow area located between said first and second annular spoke attachment portions.
33. A bicycle rim, comprising:
an outer annular surface configured to receive a tire thereon;
a pair of oppositely facing spoke attachment portions extending radially inwardly from said outer annular surface; and
an inner annular surface extending between said spoke attachment portions, said spoke attachment portions being provided with a plurality of circumferentially arranged openings and a radially extending recess located inwardly adjacent of each of said openings.
34. A bicycle rim according to claim 33, wherein
said openings of said rim are elongated slots, which extend in a substantially circumferential direction.
35. A bicycle rim according to claim 33, wherein
said openings of said rim have radial widths ranging from approximately 0.5 millimeters to approximately 2.0 millimeters.
36. A bicycle rim according to claim 33, wherein
said openings of said rim have circumferential lengths of at least approximately 5.0 millimeters.
37. A bicycle rim according to claim 36, wherein
said openings of said rim have radial widths ranging from approximately 0.5 millimeters to approximately 2.0 millimeters.
38. A bicycle rim according to claim 33, wherein
said rim includes an annular hollow area located between said first and second annular spoke attachment portions.
39. A bicycle rim according to claim 33, wherein
said first and second annular spoke attachment portions include at least twelve of said spoke openings, with at least six of said openings extending through each of said first and second annular spoke attachment portions.

16

40. A bicycle spoke, comprising:
an outer end portion configured to be received within an opening of a rim, and having a first predetermined width extending in a first direction and a first predetermined thickness extending in a second direction which is substantially perpendicular to said first direction, with said first predetermined width of said outer end portion being at least ten times said first predetermined thickness of said outer end portion, said outer end portion of said spoke having a first section and a second section coupled to said first section by an offset section such that said first section is offset from said second section to retain said outer end portions within the openings of the rim;
a center portion coupled to said outer end portion, said center portion having a second predetermined width in said first direction and a second predetermined thickness in said second direction: and
an inner end portion coupled to said center portion, said inner end portion being configured to be attached to a hub.
41. A bicycle spoke according to claim 40, wherein
said first and second sections of said outer end portion of said spoke are thinner than said offset section of said outer end portion of said spoke.
42. A bicycle spoke according to claim 40, wherein
said offset section of said outer end portion of said spoke is corrugated.
43. A bicycle spoke according to claim 40, wherein
said inner end portion is threaded.
44. A bicycle spoke according to claim 40, wherein
said outer end portion has a substantially elongated cross section.
45. A bicycle spoke to claim 40, wherein
said first predetermined width of said outer end portion is approximately 15.0 millimeters and said first predetermined thickness of said outer end portion is approximately 0.5 millimeters.

\* \* \* \* \*